March 17, 1964 A. CAPECELATRO ETAL 3,124,884
METHOD AND APPARATUS FOR DEMONSTRATING WAVE MOTION PHENOMENA
Filed Oct. 29, 1958 2 Sheets-Sheet 1

ACHILLE CAPECELATRO
WILLIAM J. SPAVEN
RENE BAKER
INVENTORS

BY Rudolph J. Jauck
ATTORNEY

March 17, 1964   A. CAPECELATRO ETAL   3,124,884
METHOD AND APPARATUS FOR DEMONSTRATING WAVE MOTION PHENOMENA
Filed Oct. 29, 1958   2 Sheets-Sheet 2

ACHILLE CAPECELATRO
WILLIAM J. SPAVEN
RENE BAKER
INVENTORS

BY Rudolph J. Jusick
ATTORNEY

United States Patent Office 3,124,884
Patented Mar. 17, 1964

3,124,884
METHOD AND APPARATUS FOR DEMONSTRATING WAVE MOTION PHENOMENA
Achille Capecelatro, Madison, William J. Spaven, North Arlington, and Rene Baker, Paterson, N.J., assignors to Madison Associates, Inc., Madison, N.J., a corporation of New Jersey
Filed Oct. 29, 1958, Ser. No. 770,450
3 Claims. (Cl. 35—19)

This invention relates to an educational method and apparatus and more particularly to a method and electronic apparatus for demonstrating various aspects of wave motion phenomena.

The method and apparatus of our invention provides means for demonstrating various aspects of wave phenomena such as interference, summation of harmonics, beats, standing waves, group velocity, Lissajous figures and components, Doppler effect, and the like. With our device, the above wave motion phenomena are demonstrated on a cathode ray oscilloscope of conventional design. In addition to providing output signals to a cathode ray oscilloscope, the apparatus includes an audio output whereby correlation of the aural and visual presentation of the above wave phenomena is obtainable when desired, for educational instruction.

In the demonstration of most wave motion phenomena, it is necessary to combine at least two alternating current signals in a manner producing the desired phenomena. Prior art apparatus for such demonstrations include the simultaneous application of the outputs of two separate oscillators to the input of a cathode ray oscilloscope. Many disadvantages result from the use of such an arrangement. For example, only the composite wave form of the input signals is ordinarily seen on the cathode ray tube (C.R.T.) of the oscilloscope. It will be apparent that a view of the composite wave form is of limited educational value without a knowledge of the component waveforms comprising the composite. With the apparatus of our invention, the component waveforms, as well as the composite waveform, are visible simultaneously. Unless extremely stable separate oscillators are used in prior art apparatus the composite waveform exhibited on the cathode ray tube will continuously change as the said oscillators "drift." With such an arrangement, it will be apparent that although the oscillator output amplitudes could be adjusted, there would be no simple means of establishing and controlling the phase relation between the same. Further, since the sweep oscillator of most oscilloscopes is subject to frequency drift, the possibility of establishing and controlling the phase relations between the two oscillator input signals and the sweep oscillator is remote. Hence, it will be understood, that such prior art arrangements are wholly inadequate for the demonstration of most wave motion phenomena. Other prior art arrangements include a plurality of generators having armatures mounted on a single rotatable shaft. Field coils are associated with the individual armatures, and are adjustably positioned to provide variations in the phase of the armature outputs. Again, only the composite waveform is available from the apparatus.

The method and apparatus of our invention avoids many of the above shortcomings of the prior art devices by the inclusion therein of a system oscillator which provides a rectangular or sawtooth wave to each of two (or more) signal channels. The several channels include tuned filter circuits whereby a desired harmonic frequency of the system oscillator may be filtered out and amplified in each channel; the filtered channel signals being of the same frequency or harmonically related. The individual component channel signals are fed to a mixer or summation circuit whereby the composite waveform of the component channel signals is obtained at the mixer output. The component and composite signals are fed to individual gate circuits, which gates are consecutively actuated to an open position by an output signal from an electronic switch. The electronic switch is triggered by pulses from the system oscillator whereby the gating of the composite and component signals is synchronized with the said signals. The gated outputs may be fed to the vertical deflection plates of the oscilloscope upon which the waveforms are to be viewed. The system oscillator provides a synchronization signal to the oscilloscope sweep generator to lock-in the sweep output with the signals originating with the system oscillator. The D.-C. bias levels of the component and composite signals are individually adjustable at the gating circuits whereby the said signals may be made to appear in either a superimposed relation on the cathode ray tube of the oscilloscope or directly "above" each other; i.e., the three, or more, signals are graphically plotted against the same time base, however, by adjustment of the said D.-C. bias of the individual signals, the signals may be presented on the same, or separate, ordinate axes. The educational advantages of being able to view the composite and component signals on separate ordinate axes, over the prior art arrangements wherein signals are viewed in a superimposed relation will be apparent to those skilled in this art.

Since many wave motion phenomena are demonstratable both visually and aurally, means are provided to feed the ungated component and composite signals to phones, loudspeakers, or the like. In this manner correlation is provided between the aural and visual presentations. Educational advantages are derived by having the students view the components and composite signals at the same time, and also to listen to the said signals, during the demonstration of certain aspects of wave motion phenomena.

For the demonstration of beats, standing waves, group velocity, Doppler effect, and the like, frequencies above and/or below the frequency of oscillation of the system oscillator are necessary. To this end, we provide separate variable frequency oscillators for each channel for the creation of signals above and below the frequencies filtered from the system oscillator. The system oscillator remains, however, the source of synchronization for the electronic switch and oscilloscope sweep generator. In this manner, the said unsynchronized component signal, or signals, appear to travel across the face of the cathode ray tube of the oscilloscope. By proper adjustment of the frequency of the component signals, the above phenomena are readily produced.

Means are also provided whereby one or more of the component and composite signal outputs may be fed to any desired accessory equipment, such as a simple series resistance-capacitance-inductance circuit, for example, and the output across the various circuit elements fed through the gating circuitry of the apparatus to provide an input to the oscilloscope. In this manner, the potential difference across each circuit element may be observed. Obviously, any of numerous other accessories may be utilized for demonstration of other phenomena, with the apparatus of our invention.

An object of this invention is the provision of a method and means for demonstrating various aspects of wave motion phenomena visually and/or aurally.

An object of this invention is the provision of a method and apparatus for producing a composite waveform from two, or more, component wave forms which are variable in phase and amplitude, and presenting at the same time the components and composite waveforms on the screen of a single gun cathode ray tube, the D.-C. level of the said waveforms being individually adjustable whereby the waveforms may be presented on vertically displaced horizontal axes on the said screen.

An object of this invention is the provision of a method and apparatus for displaying a composite waveform on an oscilloscope without drifting in the face of frequency drifting of the component waves comprising the said composite waveform.

An object of this invention is the provision of a method and apparatus for establishing, maintaining, and controlling the phase difference between components of a composite waveform.

An object of this invention is the provision of an economical apparatus for demonstrating wave motion phenomena such as interference, summation of harmonics, beats, standing waves, group velocity, Lissajous figures, Doppler effect, and the like, by means of which apparatus the student may not only view the composite waveform but also simultaneously may view the component waveforms on a single gun cathode ray tube.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views.

Figure 1:
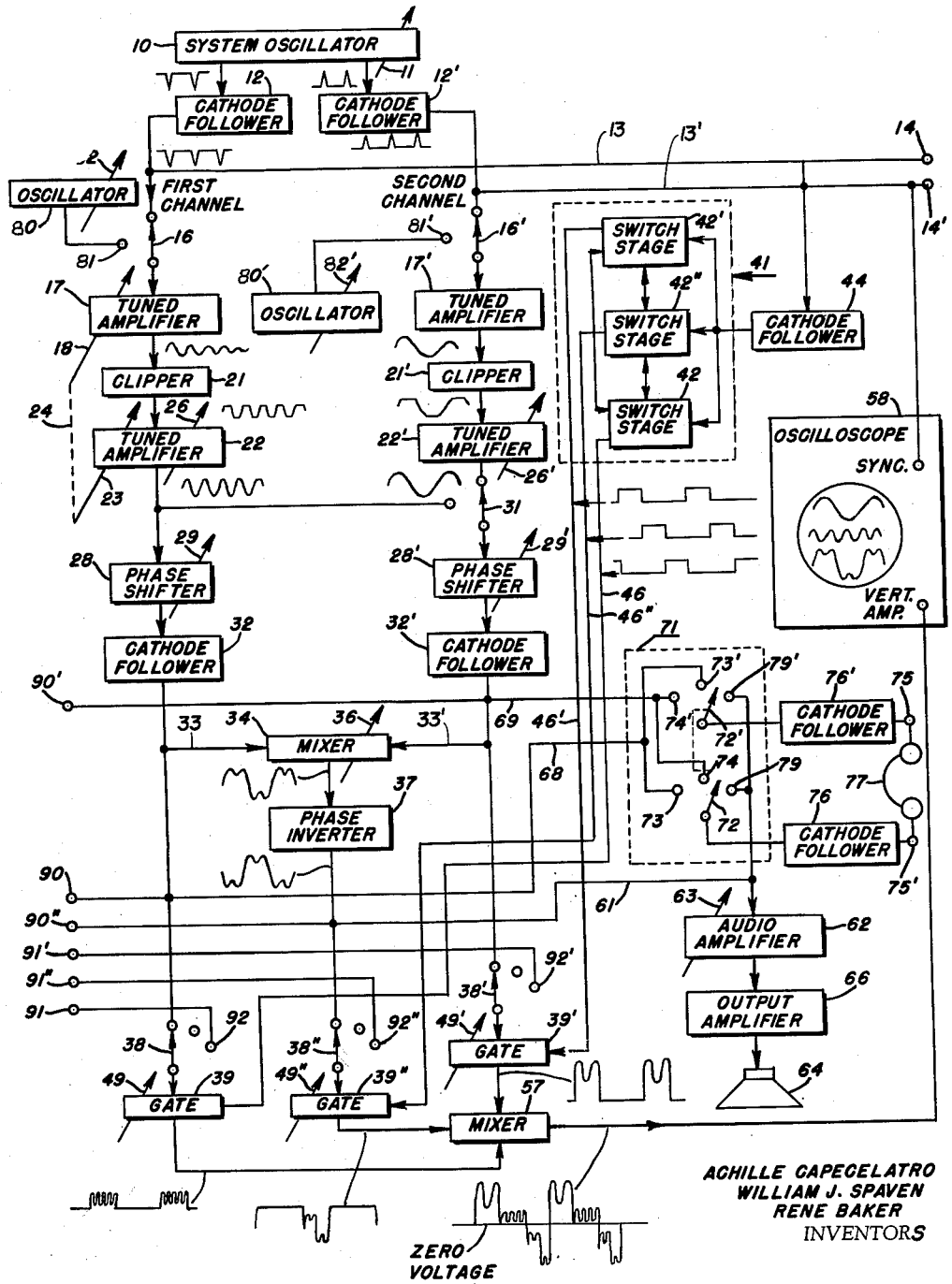
FIGURE 1 is a diagrammatic representation of an educational apparatus embodying our invention.

Reference is first made to FIGURE 1 of the drawings wherein there is shown a system timing oscillator 10, which may comprise a non-sinusoidal oscillator of the free-running multivibrator type, for example. The oscillator provides outputs of negative and positive-going pulses, the frequency of which pulses may be varied as indicated symbolically by the arrow 11. For purposes of illustration only, the nominal center frequency of the oscillator 10 will be taken as being 250 cycles per second. It will here be understood, however, that the frequency at which the apparatus functions is not critical since any suitable frequency, preferably within the audio-frequency range, may be employed. If an audio output is not desired, any frequency of oscillation is suitable.

The negative and positive-going oscillator output pulses are fed to cathode follower stages 12 and 12', respectively, which may be of conventional design. The cathode follower outputs are connected through lead wires 13 and 13' to terminals 14 and 14', respectively. Negative and positive-going pulses are thereby available at the terminals 14 and 14' for synchronization of the horizontal sweep generator employed in the oscilloscope used in conjunction with the apparatus of our invention for visual presentation of the output signals from the apparatus. In FIGURE 1, the synchronization terminal 14' is shown connected to the "sync" terminal of the oscilloscope. With both negative and positive synchronization signals available it will be apparent that synchronization to the oscilloscope may comprise, singly or in combination, (1) pulses to the sweep, and (2) sawtooth waveforms to the horizontal input.

The cathode followers 12 and 12' comprise a part of first and second channels, respectively, within which channels component sinusoidal waveforms, which are adjustable in both magnitude and phase, are produced. The said component waveforms are mixed to provide a composite waveform, in a manner described below. Although the illustrated apparatus includes only two channels for the production of first and second component waveforms, it will be understood that, in accordance with our invention, more than two channels may be employed, which channels are adapted to be supplied with an input from the system oscillator. The resulting composite waveform would, then, comprise two or more component waves.

Continuing the description of the apparatus of FIGURE 1, the outputs from the cathode followers 12 and 12' are also fed through selector switches 16 and 16' to tuned first amplifiers 17 and 17', respectively. The tuned amplifier 17' in the second channel is preferably tuned to the second harmonic of the system oscillator frequency. Since the non-sinusoidal system oscillator output is rich in harmonics, the output from the said tuned first amplifier 17' comprises a slightly damped sine wave having a frequency of twice the system oscillator frequency which, in the illustrated example, is 500 cycles per second for a system oscillator frequency of 250 cycles per second. The tuned first amplifier 17, on the other hand, is preferably selectably tuned, as indicated, by the arrow 18, to the second, fourth, or sixth harmonic frequency of the system oscillator, i.e., 500, 1000, and 1500 cycles per second. The illustrated damped waveform output from the amplifier 17 shows such amplifier tuned to the fourth harmonic, or 1000 cycles per second.

In order to obtain substantially sinusoidal component waveforms, the damped outputs from the first tuned amplifiers 17 and 17' are fed through clippers 21 and 21' to second tuned amplifiers 22 and 22', respectively. The second tuned amplifiers are tuned to the same harmonic frequencies as the first tuned amplifiers in the same channel. To this end the adjusting means 23 for tuning the second tuned amplifier 22 is mechanically coupled, as indicated at 24, to the tuning selector 18 of the first tuned amplifier 22. The amplitude outputs of the second tuned amplifiers 22 and 22' may be varied as designated symbolically by means of arrows 26 and 26', respectively. The amplitude adjustment means 26 and 26' provide means whereby the component waveforms produced in the channels are independently adjustable.

The outputs from the tuned second amplifiers 22 and 22' are connected to phase shifters 28 and 28' by means of which the relative phase of each component signal is variable as illustrated by the arrows 29 and 29', respectively. It will be noted that the tuned second amplifier 22 is directly connected to the phase shifter 28 while the tuned second amplifier 22' is connected to the phase shifter 28' through a switch 31. When the movable arm of the switch 31 is positioned to the left, as viewed in FIGURE 1, the tuned second amplifier 22' output is removed from the phase shifter 28', and the output from the amplifier 22 is fed to both phase shifters 28 and 28'. In this manner, two substantially identical component waveforms are obtained from the apparatus, which waveforms are ideally suited for the demonstration of complete destructive interference, in a manner described hereinbelow. For most wave motion demonstration purposes, however, the switch arm 31 is positioned in the vertical position, as viewed in FIGURE 1, whereby the output from the second tuned amplifier 22' is fed to the phase shifter 28'.

The phase and amplitude adjustable component waveforms from the phase shifters 28 and 28' are fed through cathode followers 32 and 32' and lead wires 33 and 33', respectively, to a mixer circuit 34. The output from the mixer comprises the composite waveform of the component waveforms fed thereto. The amplitude of the composite waveform from the mixer is variable, as indicated schematically by the arrow 36. The variable amplitude composite signal from the mixer is fed to the input of a phase inverter 37 which merely restores the composite waveform to the desired phase following an undesired phase shift therein by the mixer.

The component waveforms from the cathode followers 32 and 32' and the composite waveform from the phase inverter 37 are fed through switches 38, 38' and 38", respectively, to the input circuits of the respective gates 39, 39' and 39". The gates are serially, or consecutively, actuated to an open position by gate actuating signals from an electronic switch 41. The electronic switch comprises a plurality of switch stages which may comprise, by way of example only, a plurality of Eccles-Jordan, or flip-flop, circuits 42, 42' and 42" which are triggered by an output from the system oscillator 10. In the illustrated apparatus, the positive-going trigger pulses from the cathode follower 12' are fed to the flip-flop circuits through the lead wire 13' and cathode follower 44. The flip-flop circuits are connected in a closed chain, or ring, in a manner well understood by those skilled in this art. Only one bistable flip-flop circuit at a time is sensitive to an input signal from the cathode follower 44. The three-flip-flop ring comprises, therefore, a three position electronic switch, the output from each flip-flop being on for a period of one cycle of the system oscillator and off for the two periods, as illustrated by the waveforms adjacent the lead wires 46, 46' and 46" connecting the respective flip-flop circuits 42, 42' and 42" to the gates 39, 39' and 39". In the illustrated embodiment, with a system oscillator frequency of 250 cycles per second, each flip-flop output has an "on-time" of 1/250 second duration and an "off-time" of 2/250 second duration.

Figure 2:
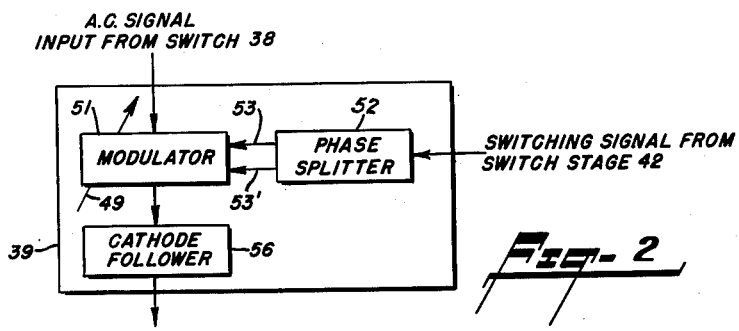
FIGURE 2 is a diagrammatic representation of one of the gate circuits utilized in the apparatus.

With alternating current input signals being fed to the gates 39, 39' and 39" through the respective switches 38, 38' and 38", the output from each gate comprises for one-third of the gating period an alternating current signal, the D.-C. level of which is adjustable positively and negatively, as indicated by means of the arrows 49, 49' and 49". During the remainder two-thirds cycle, the gate output is maintained at a zero level. Reference is made to FIGURE 2 wherein there is illustrated in expanded block diagram form a suitable gate 39. The illustrated gate comprises a modulator 51 to which the A.-C. signal from the switch 38 is directly fed. The switching signal from the flip-flop 42 is fed to a phase-splitter 52 which, in turn, is connected to the modulator. The phase splitter output comprises opposite polarity switching signals connected to the modulator 51 through lead wires 53, 53'. By the adjustable means 49, the D.-C. level of the A.-C. signal portion of the modulator output is manually variable in both a positive and negative direction. The modulator output is connected to a cathode follower 56, from which the gate output is obtained. The above gate is an example of a suitable gating means for use in the apparatus, which gate provides means for varying the D.-C. level of the gated signal.

Reference is again made to FIGURE 1 wherein the outputs from the gates 39, 39' and 39" are shown connected to a mixer stage 57. The output from the mixer, therefore, comprises the summation of the alternating current outputs from the gates 39, 39' and 39". Since only one gate at a time provides an A.-C. input signal to the mixer, the mixer output comprises the consecutively occurring gated component and composite signals. The mixer output is shown applied to the vertical amplifier of the oscilloscope 58. By adjusting the oscilloscope sweep generator oscillator frequency to 250 cycles per second, and locking in the sweep frequency with a synchronization signal from the apparatus (the terminal 14' being shown connected to the "sync" terminal of the oscilloscope) the component and composite signals appear on the same time base axis, but are vertically disposed one from the other on different ordinate axes by adjustment of the D.-C. bias level of the gates.

For maximum educational effect, means are provided whereby audible outputs of the audio frequency component and composite wave forms are available. The correlation between the visual presentation on the oscilloscope and the aural presentation, described hereinbelow, in the demonstration of various wave phenomena aids the student in the understanding of such phenomena. Also, binaural demonstrations are possible with the apparatus. As seen in FIGURE 1, the composite waveform from the phase inverter 37 is connected through lead wire 61 to the input of the first stage 62 of an audio amplifier, the amplitude output of which stage is variable, as indicated symbolically by the arrow 63. The variable first stage audio output signal is connected to a loudspeaker 64, or the like, through a power output stage 66. Thus, the composite signal is audibly available at the loudspeaker 64.

The component waves from the cathode followers 32 and 32' are shown connected through lead wires 68 and 69 to a switch 71, which switch includes a pair of rotatable switch arms 72, 72'. The wires 68 and 69 are connected to stationary switch contacts 73, 73' and 74, 74', respectively, while the movable switch arms 72 and 72' are connected to the inputs of cathode follower stages 76 and 76', respectively. The output from each of the cathode follower stages is applied to phones 77, through phone terminals 75 and 75'. By means of the switch 71, the component waves may be fed to either receiver of the phones. Thus, with the movable switch arms 72, 72' in a vertical position, as viewed in FIGURE 1, the component wave from the cathode follower 32 is connected to one receiver of the pair of phones through the cathode follower 76' while the component wave from the cathode follower 32' is connected to the other receiver through the cathode follower 76. With the switch arms 72, 72' in the left-hand position, as viewed in FIGURE 1, the component waves to the phones are reversed. Other stationary switch contacts 79, 79' are provided which are connected together, and to the input circuit of the first audio stage 62. With the switch arms 72, 72' in the right-hand position, as viewed in FIGURE 1, the composite wave is fed to both cathode followers 76, 76'. It will be understood that individual speakers, or other suitable transducers, may be substituted for each receiver of the phones 77 whereby binaural phenomena may be easily demonstrated to a group of individuals.

The operation of the apparatus thus far described is believed to be apparent from the above description thereof. The operation will be clearly understood from a consideration of the various wave phenomena demonstrations which are possible. First, however, it will be understood that for purposes of further description, the component sine wave outputs from the cathode followers 32 and 32' in the respective first and second channels of the apparatus may be referred to as fundamental, second or third harmonic components. Thus, with a 250 cycle per second system oscillator output frequency applied to the first tuned amplifier 17 and 17', the fundamental frequency component, is a sine wave of 500 cycles per second while the second and third harmonics are 1000 to 1500 cycle per second sine waves, respectively. A prime reason for not using the system oscillator frequency for the fundamental frequency of the sine wave component, is that in actual practice, gate outputs are not available a full 1/250 second due to transition time between gate open and closed position. Therefore, if a 250 cycle per second sine wave component were fed through the gate, only a portion of a complete cycle would be obtained from the gate.

With the illustrated apparatus using two component channels and one composite channel, the following demonstrations and uses are possible:

Composite Waveforms

Figure 3:
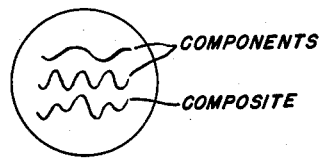
FIGURE 3 shows a three-trace signal of the apparatus output comprising fundamental and second harmonic components, and the composite thereof, as viewed on an oscilloscope.

With the switches 16, 16', and 31 and 38, 38' and 38" in the positions illustrated in FIGURE 1, interference between two sine waves of different frequency may be demonstrated by tuning the first and second tuned amplifiers 17 and 22 in the first channel to the second or third harmonic frequency. As described above, the first and second tuned amplifiers 17' and 21', respectively, in the second channel are tuned to the fundamental frequency of 500 gates per second. With the amplifiers 17 and 22 tuned to the second harmonic, for example, an actual resultant three signal trace appearing on the screen of the oscilloscope is shown in FIGURE 3. The fundamental, second harmonic and composite waveforms are shown at the top, center and lower portion of the screen, respectively. The D.-C. level of each trace, however, is adjustable both negatively and positively, as indicated by the arrows 49, 49' and 49" at the respective gates 39, 39' and 39", as described above. Thus, by adjustment of the D.-C. level, the traces may be superimposed on the screen, or arranged in any desired order.

Figure 4:
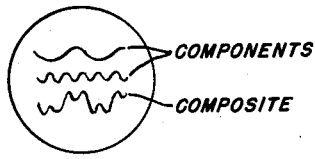
FIGURE 4 is similar to FIGURE 3 only showing fundamental and third harmonic components.

It will be noted that each trace is produced, or developed, against the same time base. By adjusting the sweep generator of the oscilloscope to 250 cycles per second and locking it in at that frequency with a synchronization signal from the system oscillator, normally encountered frequency drift of the system oscillator 10 or of the sweep generator oscillator of the oscilloscope will produce no equivalent drifting of the oscilloscope traces. Thus, the relative phase of each component signal may be adjusted and controlled by the phase shifters 28 and 28'. Independent adjustment of the amplitude of the component signals are also provided by the adjusting means 26, 26' of the tuned second amplifiers. It will be understood, then, that an infinite number of steady composite signals may be produced on the oscilloscope screen, together with the sine wave component signals. In FIGURE 4 of the drawings, traces of fundamental and third harmonic component signals, together with the composite thereof, are shown. The educational advantages in viewing both the composite and the component waveforms, and noting the changes in the composite with changes in the component signals will be apparent to those skilled in this art.

The apparatus is also suitable for the solution of problems, or the checking of the answers thereto, involving the addition of component waveforms. For example, the problems may be set up by selecting the frequency, amplitude, and phase independently for each component wave. The resultant composite may then be checked quantitatively. Further, alternating current problems usually solved by the use of rotating vectors can be solved directly with the apparatus, or solutions can be checked quantitatively.

A first approximation to wave synthesis by Fourier analysis is possible by the method and apparatus of our invention. Thus, it will be understood that a fundamental and a third harmonic component waveforms can be adjusted for the first approximation to a composite rectangular-shaped wave. By shifting the relative phase only of one of the component signals, a resultant composite signal of a generally triangular wave is obtained. A fundamental and second harmonic component waveforms can be adjusted for the first approximation to a saw-tooth composite wave. By use of an apparatus having additional channels for the production of additional component waveforms, synthesis of more than two component waves by Fourier analysis is possible, as will be understood by those skilled in this art.

The method and apparatus of our invention is particularly adapted for the demonstration of interference between two sine waves of the same frequency. The amplifiers 17 and 22 in the first channel are tuned to the fundamental frequency; the same frequency at which the amplifiers 17' and 22' in the second channel are tuned. The composite wave will be at the same fundamental frequency but its amplifier will change and its phase will shift as the phase only of one of the component waves is shifted by the phase shifter 28 or 28'.

Figure 5:
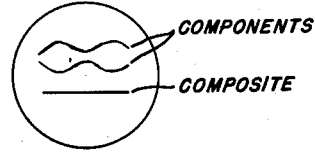
FIGURE 5 is similar to FIGURE 3 only showing complete destructive interference between component waveforms of the same frequency.

With the same amplitude component signal from each channel, all possible degrees of interference between complete constructive to complete destructive interference can be observed by way of the composite waveform on the oscilloscope. A complete destructive interference situation is illustrated in the oscilloscope traces of FIGURE 5 of the drawings. Complete destructive interference, when the amplitude of the component waves is the same, is of course accompanied by cancellation of the sound heard from the loudspeaker 64. The students can easily observe that, starting with complete destructive interference, varying the phase only in either channel will bring back a signal on the composite trace; or by reducing the output of one component signal to zero, that the subtraction of one signal from a resultant zero composite signal, will result in a composite signal.

Ordinarily, the fundamental component waves will comprise slightly distorted sine waves, which distortion is not readily visible on the oscilloscope. When, however, two fundamental waves having slightly different distorted sine wave shapes are utilized in the demonstration of complete destructive interference, a small composite wave is visible on the oscilloscope. To eliminate this, the switch arm of the switch 31 is moved to the left hand position, as viewed in FIGURE 1, whereby the second tuned amplifier 22 provides identical component waves to the phase shifters 28 and 28'. With two identical waves, truly complete destructive interference may be demonstrated.

The advantages of our method and apparatus for the demonstration of complete destructive interference over prior art methods which provide only a composite waveform output will be readily apparent. Complete destructive interference, wherein no composite signal is produced, is useless educationally unless the student can see that the amplitudes of the components remain constant and that only the phase relation between the signals is being changed.

By adjusting the amplitude control 63 of the first audio amplifier stage 62 to obtain an audio output of the composite wave from the loudspeaker 64, aural correlation can be observed of changes in quality with changes in the viewed waveform of the composite due to variations in amplitude and/or phase of the component waves. The aural and visual correlation in the demonstration of various wave phenomena is of obvious educational value.

Beats

For the demonstration of wave phenomena such as beats, standing waves, group velocity, and the like, component waves must be provided which are of slightly different frequency. To this end we provide separate variable frequency oscillators 80 and 80', which are connected to the stationary contacts 81 and 81' of the selector switches 16 and 16', respectively. The frequency of the oscillator outputsa re variable as indicated by the arrows 82 and 82'. The oscillators may each comprise a nonsinusoidal wave generator of the same type as the system oscillator 10, and as the system oscillator, the oscillators 80 and 80' are variable about a frequency of 250 cycles per second. With the movable switch arms of the switches 16 and 16' in the left hand position, as viewed in FIGURE 1, the variable frequency oscillator outputs are applied to the inputs of the first tuned amplifiers 17 and 17', respectively. It will here be noted, however, that the synchronization signals at the terminals 14 and 14' are provided by the system oscillator 10 regardless of the position of the switches 16 and 16'.

Figure 6:
FIGURE 6 is similar to FIGURE 3 only showing beats between component waves of different frequency.

For beat phenomenon demonstration, the switch 16 is positioned to transfer a signal from the variable frequency oscillator 80 to the first tuned amplifier 17, which amplifier, together with the coupled second tuned amplifiers 22, are tuned to a frequency of 500 cycles per second. The switch 16' is positioned as illustrated whereby the system oscillator 10 feeds the tuned first amplifier 17'. The variable frequency oscillator 80 is tuned to a slightly higher or lower frequency than the system oscillator 10. One beat frequency demonstration on the screen of the cathode ray tube is illustrated in FIGURE 6 of the drawings. The illustrated traces are obtained by tuning the sweep generator of the oscilloscope to about 250 cycles per second, and locking-in the sweep generator with a synchronization signal from the system oscillator. It will be noted that the fundamental frequency of 500 cycles per second (assuming a system oscillator frequency of 250 cycles per second) illustrated as the uppermost trace, is locked in step on the oscilloscope cathode ray tube. The output from the first channel, which is a signal having a frequency either slightly greater or less than 500 cycles per second, and illustrated by the center trace in FIG-URE 6, is not locked in on the cathode ray tube. If the first channel component signal frequency is greater than the fundamental frequency, the trace thereof will appear to travel to the left on the oscilloscope and, if the component waveform frequency is greater than the fundamental frequency, the trace will appear to travel to the right across the screen, in the direction of the arrow 83. The speed at which the component signal trace travels across the tube is proportional to the difference in frequency between the said locked-in component wave and the other component. The composite waveform is illustrated at the lower portion of the oscilloscope screen, and it likewise is not locked-in step on the screen. Since the frequency of the composite wave is one-half the sum of the frequencies of the component waves, its motion is at one-half the speed of the trace directly thereabove, and in the same direction; that is, in the direction of the arrow 83'.

Figure 7:
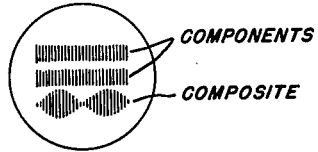
FIGURE 7 is similar to FIGURE 6 only showing the oscilloscope operating at a reduced sweep frequency.

By reducing the sweep frequency of the oscilloscope to a low value, the envelope corresponding to the audible beats may be observed, as illustrated in FIGURE 7. The audible beats will be seen to occur at a frequency equal to the difference between the two component waveform frequencies. The audible beats may also be heard on the loudspeaker 64 for a direct visual and aural correlation of the beat phenomenon.

Standing Waves

Figure 8:
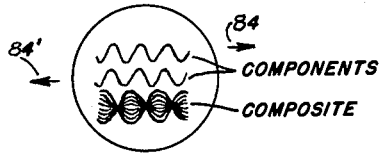
FIGURE 8 is a diagrammatic presentation of a three trace signal demonstrating a standing wave phenomenon.

The standing wave phenomenon is demonstrated by applying the outputs from the variable frequency oscillators 80 and 80' to the tuned first amplifiers 17 and 17' through the respective switches 16 and 16'. The oscillators 80 and 80' are tuned to frequencies above and below the system oscillator frequency for the same difference frequency with the said oscillator. Reference is made to FIGURE 8 of the drawings wherein a diagrammatic view of the three trace signals for the standing wave demonstration is illustrated. The two upper traces diagrammatically illustrate the two component waves. Since the oscilloscope sweep generator is locked-in with a synchronization signal from the system oscillator, the component waves are seen to move in opposite directions in the direction of the arrows 84, 84' on the cathode ray tube, with identical speeds of propagation. The resulting composite standing wave as actually produced is seen as the lower trace on the oscilloscope screen. It is possible, by varying the amplitude of the component signals, to show that sharp nodes are obtained only when each wave has the same amplitude. The positions of the nodes can be shifted by varying the phase shifter control for either channel.

Group Velocity

Figure 9:
FIGURE 9 is similar to FIGURE 8 only showing a group velocity phenomenon demonstration.

By setting one variable frequency oscillator 80 above (or below) the system oscillator frequency and the other variable frequency oscillator 80' at a second slightly different frequency also above (or below) the system oscillator frequency, and synchronizing the oscilloscope at the system oscillator frequency, the group velocity phenomenon is observed on the composite channel. Reference is made to FIGURE 9 wherein the three trace oscilloscope signal is shown. With the two component waves moving in the direction of the arrows 86, 86' at different speeds of propagation, the composite also moves in the same direction as indicated by the arrow 87, and the group speed is observed.

Lissajous Figures and Components

The method and apparatus of our invention is ideally suited for the production of Lissajous figures on one oscilloscope while viewing the component and composite waveforms on another oscilloscope. The three trace signal output is presented on one oscilloscope in a manner described above, while the individual component signals for production of the Lissajous presentation are obtained from the phone terminals 75 and 75' when the switch 71 is closed to either position connecting the channel outputs to said terminals. As will be well understood by those skilled in this art, the Lissajous patterns are obtained by connecting one phone terminal to the vertical electron-beam-deflecting plates of an oscilloscope and connecting the other phone terminal to the horizontal electron-beam-deflecting plates of the said oscilloscope. The phase difference between two component signals is easily adjusted and the effect thereof observed in both the Lissajous figure and in the composite channel output. When a fundamental and a slightly different frequency components are used, the method of comparing frequencies by Lissajous figures is clearly related to beats, both visually and audibly. Further, the demonstration is useful in explaining circularly polarized and elliptically polarized wave phenomena.

Binaural Studies

For binaural studies, high impedance crystal head phones, preferably, are connected to the phone terminals 75, 75'. With this arrangement, the component signal output from one channel is applied to one receiver of the phones and the signal output from the other channel is applied to the other receiver. Thus, one component signal is presented to one ear and the other component signal is presented to the other ear. The presentation on the cathode ray tube of the oscilloscope is used to monitor visually the audible presentation to each ear.

Several effects may be demonstrated with the above arrangement. Starting with complete destructive interference on the cathode ray tube, and thereby providing sounds to each ear which are known to be exactly alike in amplitude and frequency, fatigue and direction may be demonstrated. Fatigue is demonstrated by first subjecting one ear alone to the signal and then the other. The second applied signal will appear to be much louder than the signal that had been applied to the one ear for about 10–20 seconds, then it will apparently decrease in intensity until there is no noticeable difference. Fatigue is thereby effectively demonstrated.

By applying the above identical signals to each ear, directional sensing is demonstrated by varying the phase of the signals. The apparent direction from which the sound is heard will change with changes in the phase relation of the signals to the ears.

Another binaural study involving beats may be performed with the apparatus of our invention. The apparatus is adjusted for demonstration of beats in the manner described above and illustrated by the signal traces of FIGURE 7. By applying the separate component channel signals to each ear, beats are not heard. However, if the beat frequency is quite low, the sound seems to move back and forth from left to right. If the phones are removed from the ears, and the audible signals are allowed to mix in the air, beats will be heard. The non-linear response of the ear is thus demonstrated.

*Doppler Effects*

The Doppler effect phenomenon is demonstrated by adjusting the apparatus for an output from a single channel. The phase of the signal is then shifted by adjustment of the phase shifter control 29 or 29'. Changing of the phase control varies the electrical time delay in the channel which is equivalent to changing the length of the electrical path between the signal source and the observer. The Doppler effect is thereby noted both visually and audibly during the changing of the signal phase.

The apparatus of our invention is obviously not limited in use to the above-mentioned wave-phenomena demonstrated. Another use is in the instruction of troubleshooting electronic equipment. The instructor, for example, could disable a circuit. Locating of the disabled circuit by the student would be facilitated by observing the resultant defect in the output waveforms obtainable from the apparatus.

The apparatus includes means whereby the component and composite signals produced therein may be fed through any desired accessory equipment before being fed to the gates 39, 39' and 39". Reference is again made to FIGURE 1 wherein outputs from the cathode followers 32, 32' and the phase inverter 37 are shown connected to output terminals 90, 90' and 90", respectively. The component and composite signals from the apparatus are thereby available for application to any desired accessory equipment. Input terminals 91, 91' and 91" are shown connected to stationary contacts 92, 92' and 92" of the respective switches 38, 38' and 38". The signals appearing at various points in the accessory circuit may be connected to the above input terminals and observed on the oscilloscope when the movable arms of the switches 38, 38' and 38" are switched to the right-hand position, as viewed in FIGURE 1. In an example mentioned above, the accessory equipment may comprise a resistor-capacitor-inductor circuit connected in various series and parallel arrangements and energized by a signal from one of the output terminals 90, 90' and 90". The signals appearing at various points in the accessory circuit may be connected to the input terminals 91, 91' and 91" and observed on the oscilloscope.

The apparatus may be employed as a low speed, three channel, electronic switch wherein inputs from any desired source are supplied to the three gates through the input terminals 91, 91' and 91" and switches 38, 38' and 38". With such an arrangement, the composite and component signals are not utilized. When used as a switch, suitable signals may be applied thereto, for example, whereby a carrier frequency is shown as one trace, a modulating waveform as another trace, and the modulated carrier as the third trace. Either amplitude or frequency modulation may thereby be demonstrated.

Many of the above-mentioned wave phenomena may be demonstrated by applying the gated outputs from the apparatus to the "Z" axis input instead of the vertical deflection plates to thereby modulate the electron beam of the cathode ray tube. In this manner, the phenomena are demonstrated as longitudinal waves instead of transverse waves on the cathode ray tube.

The novel method and apparatus of our invention provides an extremely effective and efficient means for the demonstration of various wave phenomena. Much of the effectiveness thereof results from the presentation of both the component and composite waveforms at displaced positions on the cathode ray tube, and from the correlation of the aural and visual presentation of the phenomena provided by the simultaneous production of the visual and audible signals. Teaching efficiency is achieved through the numerous wave motion phenomena demonstratable with a single apparatus by simple switching and adjusting controls. Lecture time savings on the order of several thousand percent over prior art teaching methods are provided by the method and apparatus of our invention. Further, the credibility of such demonstration is greater than the usual lecture and "blackboard" instruction.

Having now described our invention in detail in accordance with the patent statutes, various other changes and modifications will suggest themselves to those skilled in this art. It is intended that such changes and modifications shall fall within the spirit and scope of the invention as recited in the following claims.

We claim:

1. A method of demonstrating wave motion phenomena on the screen of an oscilloscope having horizontal plates and vertical deflection plates, which method comprises applying a synchronizing electrical signal of predetermined frequency to the horizontal plates of the oscilloscope; sequentially applying first, second and third electrical signals to the vertical deflection plates of the oscilloscope for the simultaneous display of the three signals on the screen of the oscilloscope, said first and second signals being sine waves and the third signal being a composite of the first and second signals, adjusting the D.C. level of the first, second and third signals to thereby vertically space the resulting signal traces on the oscilloscope screen, adjusting the frequency of the first and second signals relative to that of the said synchronizing signal so that the traces of the first and second signals become traveling sine wave traces and the trace of the composite signal travels at the average speed of the first and second signal traces.

2. The method according to claim 1, wherein the frequencies of the first and second signals are adjusted so that the frequency difference between each of these signals and the synchronizing signal is of equal magnitude but opposite sign, whereby the trace of the composite signal is a standing wave.

3. Apparatus for use with an oscilloscope having horizontal plates and vertical deflection plates for demonstrating wave motion phenomena comprising, a synchronizing signal source of predetermined frequency; means for applying the synchronizing signal to the horizontal plates of the oscilloscope; means producing a first sine wave electrical signal; means producing a second sine wave electrical signal; means for electrically combining the said first and second signals to produce a composite electrical signal; means for sequentially applying the said first, second and composite signals to the vertical deflection plates of the oscilloscope; means for adjusting the individual D.C. level of the first, second and composite signals to thereby vertically space the resulting signal traces on the oscilloscope screen; and means for varying the individual frequencies of the said first and second signals above or below the synchronizing signal frequency.

References Cited in the file of this patent

UNITED STATES PATENTS

| | | |
|---|---|---|
| 2,378,383 | Arndt | June 19, 1945 |
| 2,416,353 | Shipman | Feb. 25, 1947 |
| 2,577,758 | Hastings | Dec. 11, 1951 |
| 2,602,836 | Foster et al. | July 8, 1952 |
| 2,679,013 | Barnes | May 18, 1954 |
| 2,697,959 | Kent | Dec. 28, 1954 |
| 2,706,265 | Buehler | Apr. 12, 1955 |
| 2,782,366 | Wall | Feb. 19, 1957 |
| 2,850,668 | Katz | Sept. 2, 1958 |

FOREIGN PATENTS

| | | |
|---|---|---|
| 328,010 | Great Britain | Apr. 16, 1930 |